UNITED STATES PATENT OFFICE.

WILLIAM R. JOHNSTON, OF MEMPHIS, TENNESSEE.

IMPROVEMENT IN THE MANUFACTURE OF CITRIC ACID.

Specification forming part of Letters Patent No. 103,340, dated May 24, 1870.

*To all whom it may concern:*

Be it known that I, W. R. JOHNSTON, of Memphis, in the county of Shelby and State of Tennessee, have invented a new and useful Improvement in the Manufacture of Citric Acid; and I do hereby declare that the following is a full, clear, and exact description thereof, which will enable others skilled in the art make and use the same.

This invention has for its object to facilitate the manufacture of citric acid from the hitherto worthless sour or bitter oranges which abound in the southern States of the Union.

The acid is produced by precipitating it either by means of lime or lead; but as the transportation from the various sections of the oranges or their juices from the various sections of the country to any place of manufacture would involve an amount of labor and expense not warranted by the income derived from the acid, and as the moist citrate is apt to ferment, some other means for overcoming these difficulties must be devised. For this purpose I dry the citrate and prepare it in this form for transportation. The oranges can thus on the plantations be pressed, and the citrate prepared and dried, and can, in the dried form, be conveyed to the market, where by a suitable acid the lime may be separated to leave the citric acid. The drying is done by suitable mechanical or chemical means.

I am aware that lime-juice is obtained from Sicily to supply our country with citric acid, that this is not safely transported in a moist state, and that it is therefore preferably presented as a magnesian citrate; but no one has heretofore discovered any means of meeting this public want in a satisfactory manner.

What, therefore, I esteem as my invention or discovery, and desire to protect by Letters Patent, is—

As an article of manufacture, dried citrate of lime obtained by pressure from sour oranges, and adapted by the use of any suitable precipitate to furnish citric acid, as set forth.

The above specification of my invention signed by me this 15th day of January, 1870.

W. R. JOHNSTON.

Witnesses:
   GEO. E. RUDISILL,
   W. B. SAFFORD.